United States Patent
Freeman et al.

(10) Patent No.: US 8,329,126 B2
(45) Date of Patent: Dec. 11, 2012

(54) APPARATUS AND METHODS FOR TREATING EXHAUST GASES

(75) Inventors: Jeremy Thomas Freeman, Durham, NC (US); Eric Baker Howell, Durham, NC (US)

(73) Assignee: Cormetech, Inc., Durham, NC (US)

( * ) Notice: Subject to any disclaimer, the term of this patent is extended or adjusted under 35 U.S.C. 154(b) by 25 days.

(21) Appl. No.: 13/157,013

(22) Filed: Jun. 9, 2011

(65) Prior Publication Data

US 2011/0305611 A1 Dec. 15, 2011

Related U.S. Application Data

(60) Provisional application No. 61/353,104, filed on Jun. 9, 2010.

(51) Int. Cl.
*B01D 53/34* (2006.01)
*B01D 53/38* (2006.01)
*B01D 53/86* (2006.01)
*B01D 53/88* (2006.01)

(52) U.S. Cl. ............. 423/210; 423/239.1; 422/168; 422/169; 422/170; 422/171; 422/177

(58) Field of Classification Search ............ 423/210, 423/239.1; 422/168–171, 177
See application file for complete search history.

(56) References Cited

U.S. PATENT DOCUMENTS

| 3,475,133 | A | 10/1969 | Muller-Wartenberg |
| 5,829,250 | A | 11/1998 | Lane et al. |
| 5,927,390 | A | 7/1999 | Lehman |
| 2003/0072693 | A1* | 4/2003 | Karrs et al. ............ 422/176 |
| 2011/0305611 | A1* | 12/2011 | Freeman et al. ............ 423/210 |

FOREIGN PATENT DOCUMENTS

| EP | 0191441 | 8/1986 |
| EP | 0587074 | 3/1994 |
| FR | 2883490 | 9/2006 |
| WO | 2008005404 | 1/2008 |
| WO | 2010051491 | 5/2010 |

OTHER PUBLICATIONS

International Search Report dated Sep. 19, 2011 for International Application No. PCT/US2011/039803.

* cited by examiner

*Primary Examiner* — Timothy Vanoy

(74) *Attorney, Agent, or Firm* — J. Clinton Wimbish; Smith Moore Leatherwood LLP

(57) ABSTRACT

The present invention, in some embodiments, provides catalyst modules and/or catalytic reactors having increased effective catalyst cross-sectional areas. In some embodiments, a catalyst module comprises a fluid stream inlet side comprising a plurality of first catalyst bodies and a plurality of first ducts and a fluid stream outlet side comprising a plurality of second catalyst bodies and a plurality of second ducts, wherein the first ducts are a fluid stream inlet to the second catalyst bodies and the second ducts are a fluid stream outlet for the first catalyst bodies.

42 Claims, 10 Drawing Sheets

APPARATUS AND METHODS FOR TREATING EXHAUST GASES

RELATED APPLICATION DATA

The present application hereby claims priority pursuant to 35 U.S.C. §119(e) to U.S. Provisional Patent Application No. 61/353,104, filed Jun. 9, 2010, which is hereby incorporated by reference in its entirety.

FIELD OF THE INVENTION

The present invention relates to apparatus and methods for treating fluids and, in particular, to the treatment of exhaust gases.

BACKGROUND

The hazards of nitrogen oxides and other compounds present in flue gases have resulted in the imposition of strict standards limiting discharges of such chemical species. To meet these standards, it is generally necessary to remove at least part of these oxides and/or other chemical species present in exhaust gases from stationary or mobile combustion sources.

Denitrification or selective catalytic reduction (SCR) technology is commonly applied to combustion-derived flue gases for removal of nitrogen oxides when passed through a catalytic reactor. The denitrification reaction comprises the reaction of nitrogen oxide species in the gases, such as nitrogen oxide (NO) or nitrogen dioxide ($NO_2$), with a nitrogen containing reductant, such as ammonia or urea, resulting in the production of diatomic nitrogen ($N_2$) and water. Moreover, various absorbent or capture technologies are used to remove other chemical species of a flue gas that are not catalytically decomposed.

The terminology catalytic reactor is generally used to describe a vessel comprising catalyst. Catalytic reactors generally comprise catalyst structures containing exhaust gas flow paths that enable contact between the exhaust gas streams and catalytically active components of the catalyst structure. The catalyst structure of a modular catalytic reactor is typically composed of one or more catalytic layers with each layer comprising a large number of modularized sections. Each modularized section further comprises a metal support framework which holds a number of catalyst bodies in place wherein sealing or packing materials between the catalyst bodies are used, if necessary, for proper flow distribution of exhaust streams passing through the catalyst bodies. The catalyst bodies contain the catalytic composition and display a physical structure that delineates flow channels or passageways for exhaust gas flow through the catalyst bodies.

In many cases, exhaust gas streams flowing through modularized sections of a catalytic reactor experience pressure drop. Pressure drop can result from structures, frictional forces and other factors impeding or resisting the flow of the exhaust gas stream. Pressure drop can result in various inefficiencies and cause parasitic power losses during industrial applications such as electrical power generation.

SUMMARY

In view of the foregoing, the present invention, in one aspect, provides catalyst modules and catalytic reactors which, in some embodiments, can mitigate inefficiencies and/or problems associated with fluid stream pressure drop. In some embodiments, catalyst modules and/or catalytic reactors described herein present increased effective catalyst cross-sectional area thereby facilitating a lower overall pressure drop through the catalyst modules and/or catalytic reactors without reducing or substantially reducing catalytic performance in the selective reduction of nitrogen oxides.

In one aspect, catalyst modules comprising catalyst bodies are described herein. In some embodiments, a catalyst module comprises a fluid stream inlet side comprising at least one first catalyst body and at least one first duct and a fluid stream outlet side comprising at least one second catalyst body and at least one second duct, wherein the at least one first duct is a fluid stream inlet to the at least one second catalyst body and the at least one second duct is a fluid stream outlet for the at least one first catalyst body.

In some embodiments, a catalyst module comprises a fluid stream inlet side comprising a plurality of first catalyst bodies and a plurality of first ducts and a fluid stream outlet side comprising a plurality of second catalyst bodies and a plurality of second ducts, wherein the first ducts are a fluid stream inlet to the second catalyst bodies and the second ducts are a fluid stream outlet for the first catalyst bodies.

A catalyst module, in some embodiments, further comprises at least one additional catalyst body positioned between the inlet side and the outlet side of the module and at least one additional fluid stream inlet duct to the at least one additional catalyst body and at least one additional fluid stream outlet duct of the at least one additional catalyst body. In some embodiments, a catalyst module further comprises at least one additional catalyst body positioned between the inlet side and the outlet side of the module, wherein a first duct serves as a fluid stream inlet to the at least one additional catalyst body and a second duct serves as a fluid stream outlet of the at least one additional catalyst body. In some embodiments wherein a first duct is a fluid stream inlet to one or more additional catalyst bodies positioned between the inlet side and outlet side of the module, the first duct provides a fluid stream to the additional catalyst bodies as well as to a second catalyst body at the outlet side of the module. In some embodiments wherein a second duct is a fluid stream outlet for one or more additional catalyst bodies positioned between the inlet side and the outlet side of the module, the second duct provides a fluid stream outlet for the additional catalyst bodies and first catalyst body.

In another aspect, the catalytic reactors comprising one or more catalyst modules described herein are provided. In some embodiments, a catalytic reactor comprises a housing and at least one catalyst module described herein disposed in the housing. The catalyst module disposed in the housing, in some embodiments, comprises a fluid stream inlet side comprising a plurality of first catalyst bodies and a plurality of first ducts and a fluid stream outlet side comprising a plurality of second catalyst bodies and a plurality of second ducts, wherein the first ducts are a fluid stream inlet to the second catalyst bodies and the second ducts are a fluid stream outlet for the first catalyst bodies.

In some embodiments, a catalytic reactor comprises a fluid stream inlet side comprising at least one first catalyst module and at least one first duct and a fluid stream outlet side comprising at least one second catalyst module and at least one second duct, wherein the at least one first duct is a fluid stream inlet to the at least one second catalyst module and the at least one second duct is a fluid stream outlet of the at least one first catalyst module.

In some embodiments, a catalytic reactor comprises a fluid stream inlet side comprising a plurality of first catalyst modules and a plurality first ducts and a fluid stream outlet side comprising a plurality of second catalyst modules and a plurality of second ducts, wherein the first ducts are a fluid stream inlet to the second catalyst modules, and the second ducts are a fluid stream outlet of the first catalyst modules. In some embodiments, catalyst modules of the fluid stream inlet side and/or fluid stream outlet side of the catalytic reactor comprise ducted catalyst modules described herein.

In some embodiments, a catalytic reactor further comprises at least one additional catalyst module positioned between the inlet side and the outlet side of the catalytic reactor and at least one additional fluid stream inlet duct to the at least one additional catalyst module and at least one additional fluid stream outlet duct of the at least one additional catalyst module. In some embodiments, a catalytic reactor further comprises at least one additional catalyst module positioned between the inlet side and the outlet side of the reactor, wherein a first duct serves as a fluid stream inlet to the at least one additional catalyst module and a second duct serves as a fluid stream outlet for the at least one additional catalyst module. In some embodiments wherein a first duct is a fluid stream inlet to one or more additional catalyst modules positioned between the inlet side and outlet side of the reactor, the first duct provides a fluid stream to the additional catalyst modules as well as to the second catalyst modules at the outlet side of the reactor. In some embodiments wherein a second duct is a fluid stream outlet for one or more additional catalyst modules positioned between the inlet side and the outlet side of the reactor, the second duct provides a fluid stream outlet for the additional catalyst modules and first catalyst module.

In another aspect, chemical species capture apparatus are described herein. In some embodiments, a chemical species capture apparatus comprises a fluid stream inlet side comprising at least one first capture body and at least one first duct and a fluid stream outlet side comprising at least one second capture body and at least one second duct, wherein the at least one first duct is a fluid stream inlet to the at least one second capture body and the at least one second duct is a fluid stream outlet for the at least one first capture body.

In some embodiments, a chemical species capture apparatus comprises a fluid stream inlet side comprising a plurality of first capture bodies and a plurality of first ducts and a fluid stream outlet side comprising a plurality of second capture bodies and a plurality of second ducts, wherein the first ducts are a fluid stream inlet to the second capture bodies and the second ducts are a fluid stream outlet for the first capture bodies.

A chemical species capture apparatus, in some embodiments, further comprises at least one additional capture body positioned between the inlet side and the outlet side of the apparatus and a least one additional fluid stream duct to the at least one additional capture body and at least one additional fluid stream outlet duct of the at least one additional capture body. In some embodiments, a chemical species capture apparatus comprises at least one additional capture body positioned between the inlet side and the outlet side of the apparatus, wherein a first duct serves as a fluid stream inlet to the at least one additional capture body and a second duct serves as a fluid stream outlet of the at least one additional capture body. In some embodiments wherein a first duct is a fluid stream inlet to one or more additional capture bodies positioned between the inlet side and outlet side of the apparatus, the first duct provides a fluid stream to the additional capture bodies as well as to a second capture body at the outlet side of the apparatus. In some embodiments wherein a second duct is a fluid stream outlet for one or more additional capture bodies positioned between the inlet side and the outlet side of the apparatus, the second duct provides a fluid stream outlet for the additional capture bodies and first capture body.

Capture bodies, in some embodiments, are operable to remove one or more chemical species from a fluid stream. In some embodiments, capture bodies reversibly remove at least one chemical species from a fluid stream. In some embodiments, capture bodies irreversibly remove at least one chemical species from a fluid stream.

In another aspect, chemical species capture reactors are described herein comprising one or more chemical species capture apparatus. In some embodiments, a chemical species capture reactor comprises a housing and at least one capture apparatus described herein disposed in the housing. The capture apparatus disposed in the housing, in some embodiments, comprises a fluid stream inlet side comprising at least one first capture body and at least one first duct and a fluid stream outlet side comprising at least one second capture body and at least one second duct, wherein the at least one first duct is a fluid stream inlet to the at least one second capture body and the at least one second duct is a fluid stream outlet for the at least one first capture body.

The capture apparatus disposed in the housing, in some embodiments, comprises a fluid stream inlet side comprising a plurality of first capture bodies and a plurality of first ducts and a fluid stream outlet side comprising a plurality of second capture bodies and a plurality of second ducts, wherein the first ducts are a fluid stream inlet to the second capture bodies and the second ducts are a fluid stream outlet for the first capture bodies.

In some embodiments, a chemical species capture reactor further comprises at least one additional capture apparatus positioned between the inlet side and the outlet side of the reactor and at least one additional fluid stream inlet duct to the at least one additional capture apparatus and at least one additional fluid stream outlet duct of the at least one additional capture apparatus. In some embodiments, a chemical species capture reactor further comprises at least one additional capture apparatus positioned between the inlet side and the outlet side of the reactor, wherein a first duct serves as a fluid stream inlet to the at least one additional capture apparatus and a second duct serves as a fluid stream outlet for the at least one additional capture apparatus. In some embodiments wherein a first duct is a fluid stream inlet to one or more additional capture apparatus positioned between the inlet side and outlet side of the reactor, the first duct provides a fluid stream to the additional capture apparatus as well as to the second capture apparatus at the outlet side of the reactor. In some embodiments wherein a second duct is a fluid stream outlet for one or more additional capture apparatus positioned between the inlet side and the outlet side of the reactor, the second duct provides a fluid stream outlet for the additional capture apparatus and first capture apparatus.

In another aspect, methods of treating a fluid stream are described herein. In one embodiment, a method of treating a fluid stream comprises providing at least one catalyst module comprising a fluid stream inlet side comprising at least one first catalyst body and at least one first duct and a fluid stream outlet side comprising at least one second catalyst body and at least one second duct, wherein the at least one first duct is a fluid stream inlet to the at least one second catalyst body and the at least one second duct is a fluid stream outlet for the at least one first catalyst body. A first portion of the fluid stream, in some embodiments, is passed through the at least one first catalyst body and out of the module through the at least one second duct. A second portion of the fluid stream, in some embodiments, is passed through the at least one second catalyst body via the at least one first duct.

In some embodiments, a method of treating a fluid stream comprises providing at least one catalyst module comprising a fluid stream inlet side comprising a plurality of first catalyst bodies and a plurality of first ducts and a fluid stream outlet side comprising a plurality of second catalyst bodies and a plurality of second ducts, wherein the first ducts are a fluid stream inlet to the second catalyst bodies and the second ducts are a fluid stream outlet for the first catalyst bodies. A first portion of the fluid stream, in some embodiments, is passed through the first catalyst bodies and out of the module through the second ducts. A second portion of the fluid stream, in some embodiments, is passed through the second catalyst bodies via the first ducts.

In some embodiments, a method of treating a fluid stream comprises providing at least one catalyst reactor comprising a fluid stream inlet side comprising at least one first catalyst module and at least one first duct and a fluid stream outlet side comprising at least one second catalyst module and at least one second duct, wherein the at least one first duct is a fluid stream inlet to the at least one second catalyst module and the at least one second duct is a fluid stream outlet for the at least one first catalyst module. A first portion of the fluid stream, in some embodiments, is passed through the at least one first catalyst module and out of the reactor through the at least one second duct. A second portion of the fluid stream, in some embodiments, is passed through the at least one second catalyst module via the at least one first duct.

A method of treating a fluid stream, in some embodiments, comprises providing a catalytic reactor comprising a fluid stream inlet side comprising plurality of first catalyst modules and a plurality first ducts and a fluid stream outlet side comprising a plurality of second catalyst modules and a plurality of second ducts, wherein the first ducts are a fluid stream inlet to the second catalyst modules, and the second ducts are a fluid stream outlet of the first catalyst modules. A first portion of the fluid stream, in some embodiments, is passed through the first catalyst modules and out of the catalytic reactor through the second ducts. In some embodiments, a second portion of the fluid stream is passed through the second catalyst modules via the first ducts. In some embodiments, catalyst modules of the fluid stream inlet side and/or fluid stream outlet side of the catalytic reactor comprise ducted catalyst modules described herein.

In some embodiments, a method of treating a fluid stream comprises providing at least one chemical species capture apparatus comprising a fluid stream inlet side comprising a first capture body and a first duct and a fluid stream outlet side comprising a second capture body and a second duct, wherein the first duct is a fluid stream inlet to the second capture body and the second duct is a fluid stream outlet for the first capture body. A first portion of the fluid stream, in some embodiments, is passed through the first capture body and out of the apparatus through the second duct. A second portion of the fluid stream, in some embodiments, is passed through the second capture body via the first ducts.

In some embodiments, a method of treating a fluid stream comprises providing at least one chemical species capture apparatus comprising a fluid stream inlet side comprising at least one first capture body and at least one first duct and a fluid stream outlet side comprising at least one second capture body and at least one second duct, wherein the at least one first duct is a fluid stream inlet to the at least one second capture body and the at least one second duct is a fluid stream outlet for the at least one first capture body. A first portion of the fluid stream, in some embodiments, is passed through the at least one first capture body and out of the apparatus through the at least one second duct. A second portion of the fluid stream, in some embodiments, is passed through the at least one second capture body via the at least one first duct.

In some embodiments, a method of treating a fluid stream comprises providing at least one chemical species capture apparatus comprising a fluid stream inlet side comprising a plurality of first capture bodies and a plurality of first ducts and a fluid stream outlet side comprising a plurality of second capture bodies and a plurality of second ducts, wherein the first ducts are a fluid stream inlet to the second capture bodies and the second ducts are a fluid stream outlet for the first capture bodies. A first portion of the fluid stream, in some embodiments, is passed through the first capture bodies and out of the apparatus through the second ducts. A second portion of the fluid stream, in some embodiments, is passed through the second capture bodies via the first ducts.

In some embodiments, a fluid stream passed through catalyst modules, catalytic reactors, chemical species capture apparatus and/or capture reactors described herein comprises an exhaust gas or flue gas stream. In some embodiments, an exhaust gas or flue gas stream is generated by the combustion of one or more hydrocarbon sources including, but not limited to, coal, natural gas and/or petroleum products. An exhaust gas stream or flue gas stream, in some embodiments, comprises on or more species of nitrogen oxide ($NO_x$).

In some embodiments, an exhaust gas or flue gas stream passed through catalyst modules, catalytic reactors, capture apparatus and/or capture reactors described herein is generated by a gas turbine, gas boiler or a coal-fired boiler. In some embodiments, an exhaust gas or flue gas stream passed through catalyst modules, catalytic reactors, capture apparatus and/or capture reactors described herein is generated by a combustion component upstream of a heat recovery steam generator (HRSG). In some embodiments, a combustion component upstream of a HRSG comprises a gas turbine.

In some embodiments, a fluid stream passed through catalyst modules, catalytic reactors, capture apparatus and/or capture reactors described herein is a liquid stream. In some embodiments, a liquid stream comprises one or more contaminants or species to be removed from the stream. In some embodiments, a liquid stream can comprise an aqueous liquid stream. In some embodiments, a liquid stream can comprise a non-aqueous or organic liquid stream.

Moreover, in some embodiments, catalyst bodies for use in catalyst modules and/or catalytic reactors described herein comprise monolithic structural catalyst bodies, plate catalyst bodies, corrugated catalyst bodies, packed particulate catalyst or combinations thereof.

In some embodiments, catalyst bodies for use in catalyst modules and/or catalytic reactors described herein are operable for the selective catalytic reduction (SCR) of $NO_x$ in an exhaust gas or flue gas stream. In some embodiments, catalyst bodies for use in catalyst modules and/or catalytic reactors described herein are operable for the removal of carbon monoxide or dioxin from an exhaust gas or flue gas stream.

In some embodiments, capture bodies for use in chemical species capture apparatus described herein are operable for applications including, but not limited to, volatile organic compound (VOC) abatement, mercury capture and flue gas desulfurization. Additionally, in some embodiments, capture bodies are operable for use as air separation absorbers or dehumidification absorbers.

These and other embodiments are described in greater detail in the detailed description which follows.

DETAILED DESCRIPTION

The present invention can be understood more readily by reference to the following detailed description and drawings and their previous and following descriptions. Elements, apparatus and methods of the present invention, however, are not limited to the specific embodiments presented in the detailed description and drawings. It should be recognized that these embodiments are merely illustrative of the principles of the present invention. Numerous modifications and adaptations will be readily apparent to those of skill in the art without departing from the spirit and scope of the invention.

Figure 1:
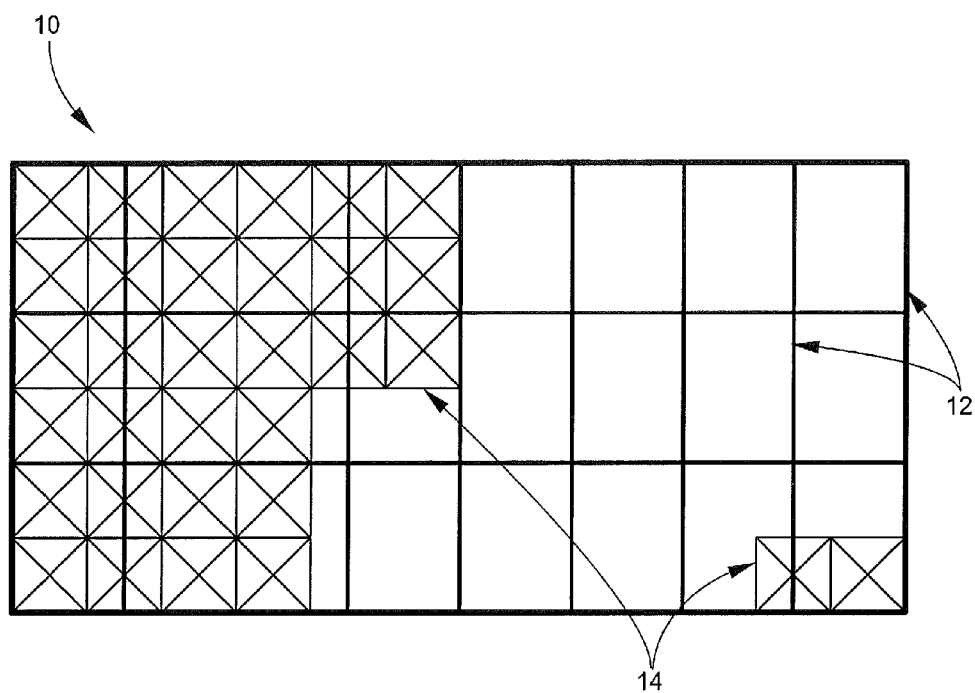
FIG. 1 illustrates one embodiment of a prior art catalyst module.

FIG. 1 illustrates a plan view of an inlet side of one embodiment of a prior art catalyst module. As illustrated in FIG. 1, the prior art catalyst module (10) comprises an open metal framework (12) for supporting monolithic structural catalyst bodies (14) disposed therein. The monolithic structural catalyst bodies (14) are arranged adjacent to one another in the framework (12) such that the catalyst bodies (14) span and completely fill the cross-sectional area of the framework (12). The catalyst module provided in FIG. 1, however, is only partially filled with catalyst bodies to illustrate the open nature of the framework (12). Packing materials can be provided between the catalyst bodies (14) to prevent exhaust gas stream flow from bypassing the catalyst bodies (14). The effective catalytic cross-sectional area of the module illustrated in FIG. 1 does not exceed the cross-sectional area of the module framework (12). As a result, limited options exist for addressing pressure drop and other inefficiencies as an exhaust stream passes through the catalyst bodies (14) of the module (10).

In view of the foregoing, the present invention provides catalyst modules and catalytic reactors which, in some embodiments, can mitigate inefficiencies and problems associated with fluid stream pressure drop. In some embodiments, catalyst modules and/or catalytic reactors described herein present increased effective catalyst cross-sectional area thereby facilitating a lower overall pressure drop through the catalyst modules and/or catalytic reactors without reducing or substantially reducing catalytic performance in the treatment of various fluid streams.

I. Catalyst Modules

In one aspect, the catalyst modules comprising catalyst bodies are described herein. In some embodiments, a catalyst module comprises a fluid stream inlet side comprising at least one first catalyst body and at least one first duct and a fluid stream outlet side comprising at least one second catalyst body and at least one second duct, wherein the at least one first duct is a fluid stream inlet to the at least one second catalyst body and the at least one second duct is a fluid stream outlet for the at least one first catalyst body.

In some embodiments, a catalyst module comprises a fluid stream inlet side comprising a plurality of first catalyst bodies and a plurality of first ducts and a fluid stream outlet side comprising a plurality of second catalyst bodies and a plurality of second ducts, wherein the first ducts are a fluid stream inlet to the second catalyst bodies, and the second ducts are a fluid stream outlet for the first catalyst bodies.

Figure 2:
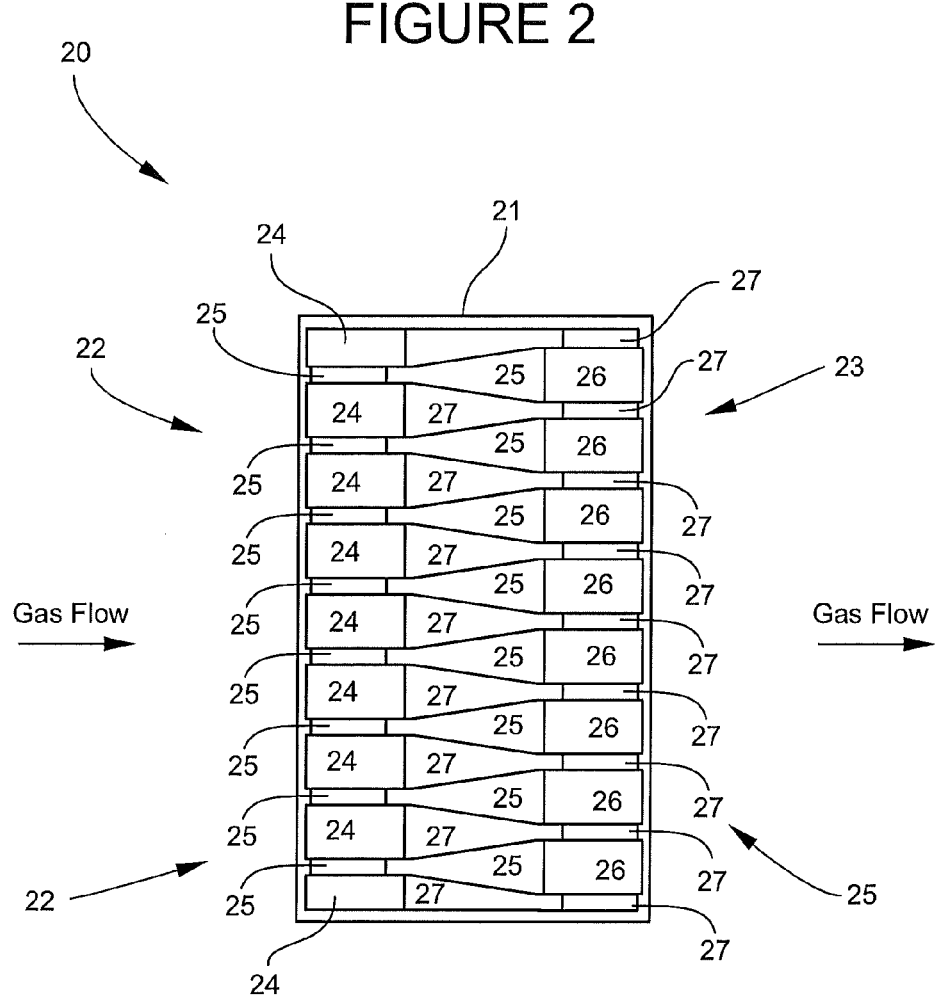
FIG. 2 illustrates a cross-sectional view of a catalyst module according to one embodiment described herein.

FIG. 2 illustrates a cross-sectional view of a catalyst module according to one embodiment described herein. The catalyst module (20) illustrated in FIG. 2 comprises a framework (21) having a fluid stream inlet side (22) and a fluid stream outlet side (23). The fluid stream inlet side (22) comprises a plurality of first catalyst bodies (24) and a plurality of first ducts (25). The fluid stream outlet side (23) comprises a plurality of second catalyst bodies (26) and a plurality of second ducts (27). The first ducts (25) are a fluid stream inlet for the second catalyst bodies (26) while the second ducts (27) are a fluid stream outlet for the first catalyst bodies (24).

In some embodiments, a first catalyst body (24) of the fluid stream inlet side (22) illustrated in FIG. 2 comprises a single catalyst body. In some embodiments, a first catalyst body (24) of the fluid stream inlet side (22) illustrated in FIG. 2 comprises a plurality of catalyst bodies. In some embodiments wherein a first catalyst body (24) comprises a plurality of catalyst bodies, the associated second duct (27) serves as a common fluid stream outlet for the catalyst bodies. In some embodiments, the associated second duct (27) comprises one or more channels or baffles (not shown) for receiving a fluid stream from the plurality of catalyst bodies (24). In some embodiments, for example, the associated second duct (27) comprises a channel or baffle for receiving a fluid stream from each of the plurality of catalyst bodies.

Moreover, in some embodiments, a second catalyst body (26) of the fluid stream outlet side (23) illustrated in FIG. 2 comprises a single catalyst body. In some embodiments, a second catalyst body (26) of the fluid stream outlet side (23) illustrated in FIG. 2 comprises a plurality of catalyst bodies. In some embodiments wherein a second catalyst body (26) comprises a plurality of catalyst bodies, the associated first duct (25) serves as a common fluid stream inlet for the catalyst bodies. In some embodiments, the associated first duct (25) comprises one or more channels or baffles (not shown) for directing a fluid stream into the plurality of catalyst bodies. In some embodiments, for example, the associated first duct (25) comprises a channel or baffle for directing a fluid stream into each of the plurality of catalyst bodies.

In the embodiment of FIG. 2, the first catalyst bodies (24) and second catalyst bodies (26) are illustrated as having a fluid inlet face normal to the direction of fluid flow. In some embodiments, fluid inlet faces of the first and/or second catalyst bodies are tilted or non-normal to the direction of fluid flow.

Figure 3:
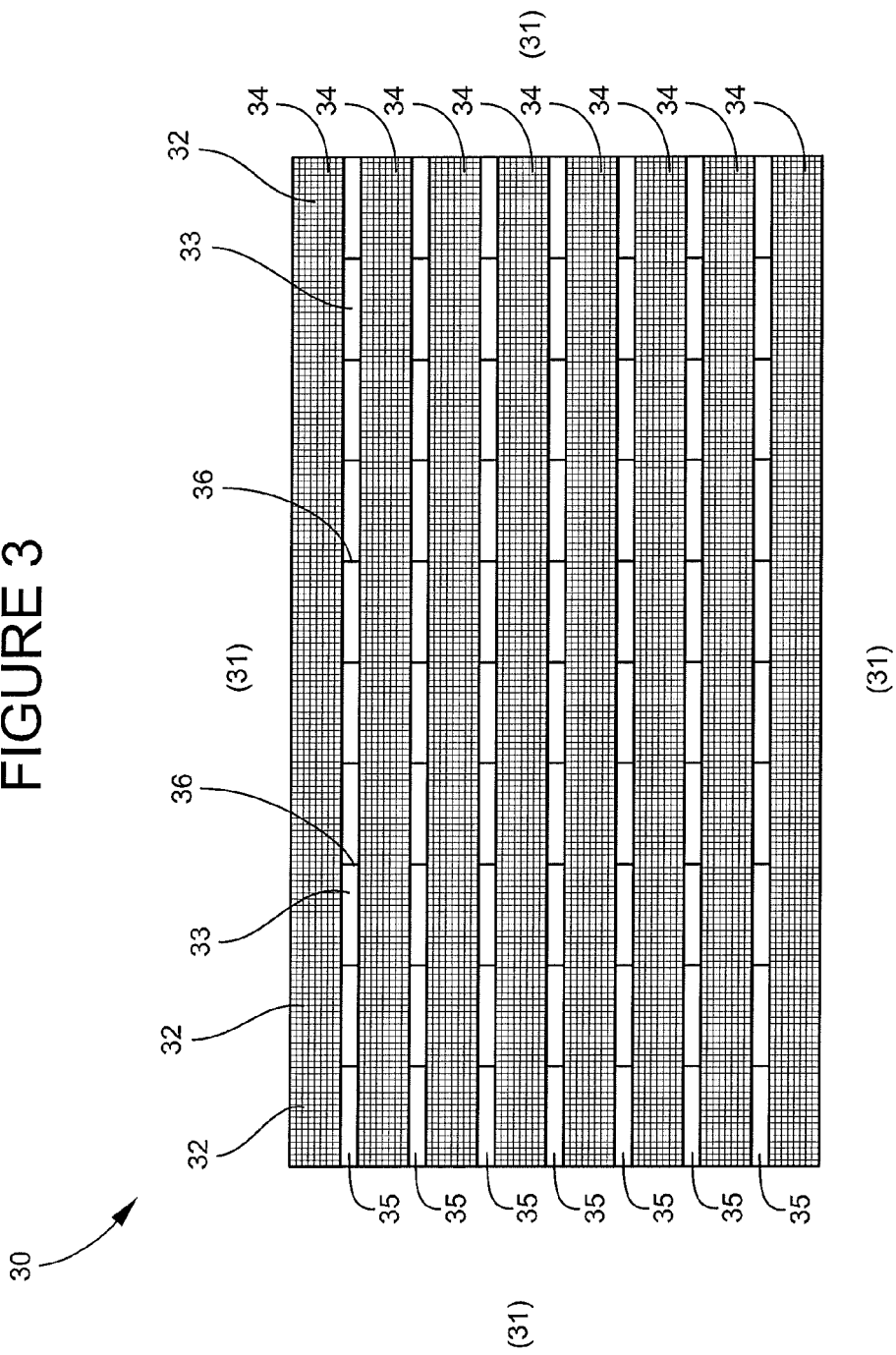
FIG. 3 illustrates a plan view of the inlet side of a catalyst module according to one embodiment described herein.

FIG. 3 illustrates a plan view of the inlet side of a catalyst module according to one embodiment described herein. As illustrated in FIG. 3, the inlet side (31) of the catalyst module (30) comprises a plurality of first catalyst bodies (32) and a plurality of first ducts (33). The first catalyst bodies (32) are arranged into rows (34) which alternate with rows (35) of the first ducts (33). In some embodiments, packing material can be disposed between individual catalyst bodies (32) of a row (34) to inhibit or prevent fluid stream flow between the catalyst bodies (32). In the embodiment illustrated in FIG. 3, posts (36) are used to delineate entrances or openings of the first ducts (33).

In an alternative embodiment, the first catalyst bodies are arranged into columns which alternate with columns of the first ducts. In some embodiments, such a columnar arrangement can be envisioned by rotating the plan view of FIG. 3 by 90 degrees.

Figure 4:
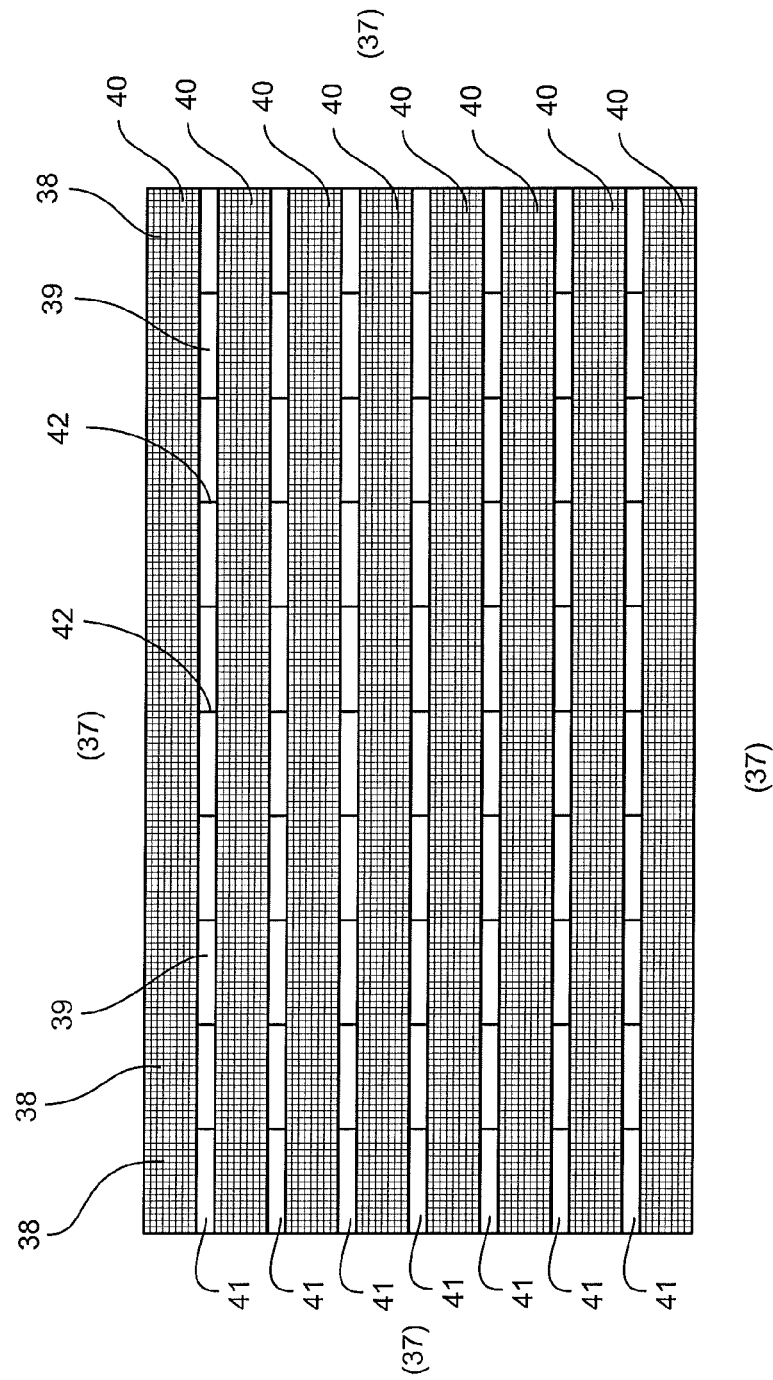
FIG. 4 illustrates a plan view of the outlet side of a catalyst module according to one embodiment described herein.

FIG. 4 illustrates a plan view of the outlet side of the catalyst module (30) illustrated in FIG. 3. The outlet side (37) of the catalyst module (30) comprises a plurality of second catalyst bodies (38) and a plurality of second ducts (39). The second catalyst bodies (38) are arranged into rows (40) which alternate with rows (41) of the second ducts (39). In some embodiments, packing material can be disposed between individual catalyst bodies (38) of a row (40) to inhibit or prevent fluid stream flow between the catalyst bodies (39). In the embodiment illustrated in FIG. 4, posts (42) are used to delineate the second ducts (39).

In an alternative embodiment, the second catalyst bodies are arranged into columns which alternate with columns of the second ducts. In some embodiments, such a columnar arrangement can be envisioned by rotating the plan view of FIG. 4 by 90 degrees.

The first ducts (33) of the inlet side (31) of the catalyst module (30) illustrated in FIG. 3 are fluid stream inlets for the second catalyst bodies (38) on the outlet side (37) of the catalyst module (30) illustrated in FIG. 4. Moreover, the second ducts (39) of the outlet side (37) of the catalyst module (30) are fluid stream outlets for the first catalyst bodies (32).

A catalyst module, in some embodiments, further comprises at least one additional catalyst body positioned between the inlet side and the outlet side of the module and at least one additional fluid stream inlet duct to the at least one additional catalyst body and at least one additional fluid stream outlet duct of the at least one additional catalyst body. In some embodiments, a catalyst module comprises a plurality of additional catalyst bodies disposed between the inlet side and the outlet side of the module and additional fluid stream inlet ducts to the additional catalyst bodies and additional fluid stream outlet ducts of the additional catalyst bodies.

Figure 5:
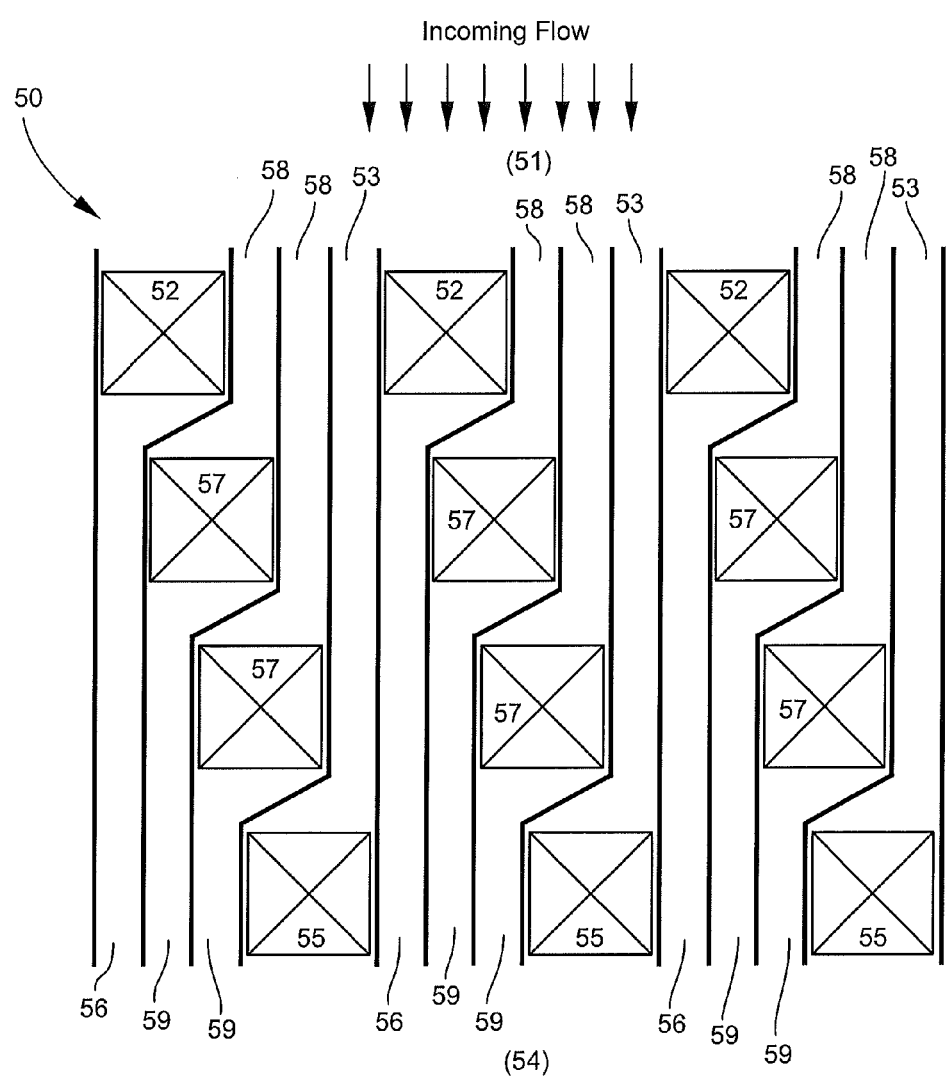
FIG. 5 illustrates a cross-sectional view of a catalyst module according to one embodiment described herein.

FIG. 5 illustrates a cross-sectional view of catalyst module comprising additional catalyst bodies according to one embodiment described herein. The catalyst module (50) comprises a fluid stream inlet side (51) comprising a plurality of first catalyst bodies (52) and a plurality of first ducts (53). The catalyst module comprises a fluid stream outlet side (54) comprising a plurality of second catalyst bodies (55) and a plurality of second ducts (56). The first ducts (53) are a fluid stream inlet to the second catalyst bodies (55), and the second ducts (56) are a fluid stream outlet of the first catalyst bodies (52).

The catalyst module (50) further comprises a plurality of additional catalyst bodies (57) positioned between the inlet side (51) and the outlet side (54) of the catalyst module (50). The inlet side (51) of the catalyst module (50) further comprises additional fluid stream inlet ducts (58) to the additional catalyst bodies (57), and the outlet side (54) further comprises additional fluid stream outlet ducts (59) of the additional catalyst bodies (57).

In some embodiments, a catalyst module further comprises at least one additional catalyst body positioned between the inlet side and the outlet side of the module, wherein a first duct serves as a fluid stream inlet to the at least one additional catalyst body and a second duct serves as a fluid stream outlet of the at least one additional catalyst body. In some embodiments wherein a first duct is a fluid stream inlet to one or more additional catalyst bodies positioned between the inlet side and outlet side of the module, the first duct provides a fluid stream to the additional catalyst bodies as well as to a second catalyst body at the outlet side of the module. In some embodiments wherein a second duct is a fluid stream outlet for one or more additional catalyst bodies positioned between the inlet side and the outlet side of the module, the second duct provides a fluid stream outlet for the additional catalyst bodies and first catalyst body.

Figure 10:
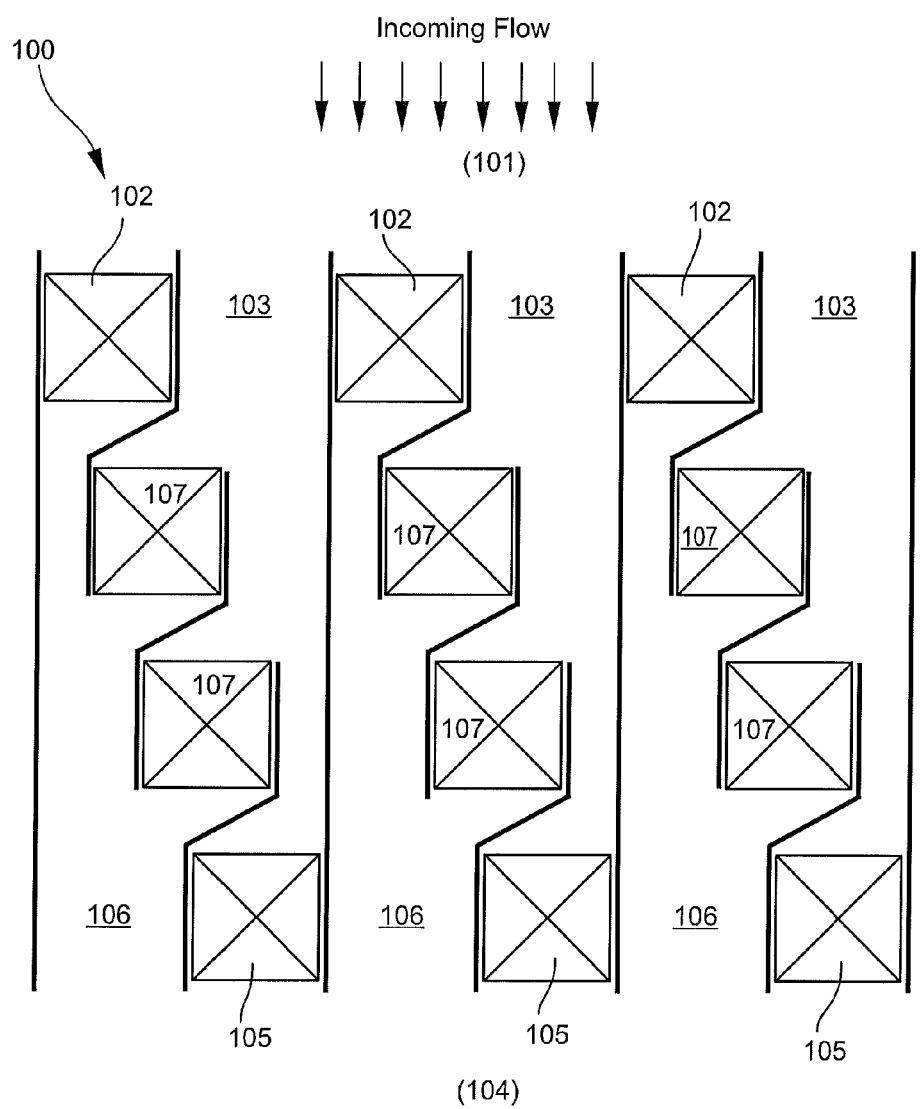
FIG. 10 illustrates a cross-sectional view of a catalyst module according to one embodiment described herein.

FIG. 10 illustrates a cross-sectional view of catalyst module comprising additional catalyst bodies according to one embodiment described herein. The catalyst module (100) comprises a fluid stream inlet side (101) comprising a plurality of first catalyst bodies (102) and a plurality of first ducts (103). The catalyst module comprises a fluid stream outlet side (104) comprising a plurality of second catalyst bodies (105) and a plurality of second ducts (106). The first ducts (103) are a fluid stream inlet to the second catalyst bodies (105), and the second ducts (106) are a fluid stream outlet of the first catalyst bodies (102).

The catalyst module (100) further comprises a plurality of additional catalyst bodies (107) positioned between the inlet side (101) and the outlet side (104) of the catalyst module (100). The first ducts (103) serve as a fluid stream inlet for the additional catalyst bodies (107) and second catalyst bodies (105) at the outlet side (104) of the module (100). Moreover, the second ducts (106) serve as a fluid stream outlet for the first catalyst bodies (102) and the additional catalyst bodies (107). As illustrated in the embodiment of FIG. 10, the catalyst module does not comprise separate additional ducts for directing a fluid stream into and out of the additional catalyst bodies. In some embodiments, however, the first ducts (103) and/or the second ducts (106) may comprise one or more baffle structures (not shown) for altering fluid flow through the additional catalyst bodies (107).

Turning now to components of catalyst modules described herein, catalyst modules described herein comprise catalyst bodies. Any type of catalyst body not inconsistent with the objectives of the present invention can be used. In some embodiments, catalyst bodies are operable to conduct the selective catalytic reduction (SCR) of nitrogen oxides in an exhaust or flue gas stream.

In some embodiments, catalyst bodies comprise monolithic structural catalyst bodies including, but not limited to, the monolithic structural catalyst bodies described in U.S. Pat. No. 7,658,898 and U.S. patent application Ser. Nos. 10/801,140 and 11/122,261, each of which is incorporated herein by reference in its entirety.

Figure 6:
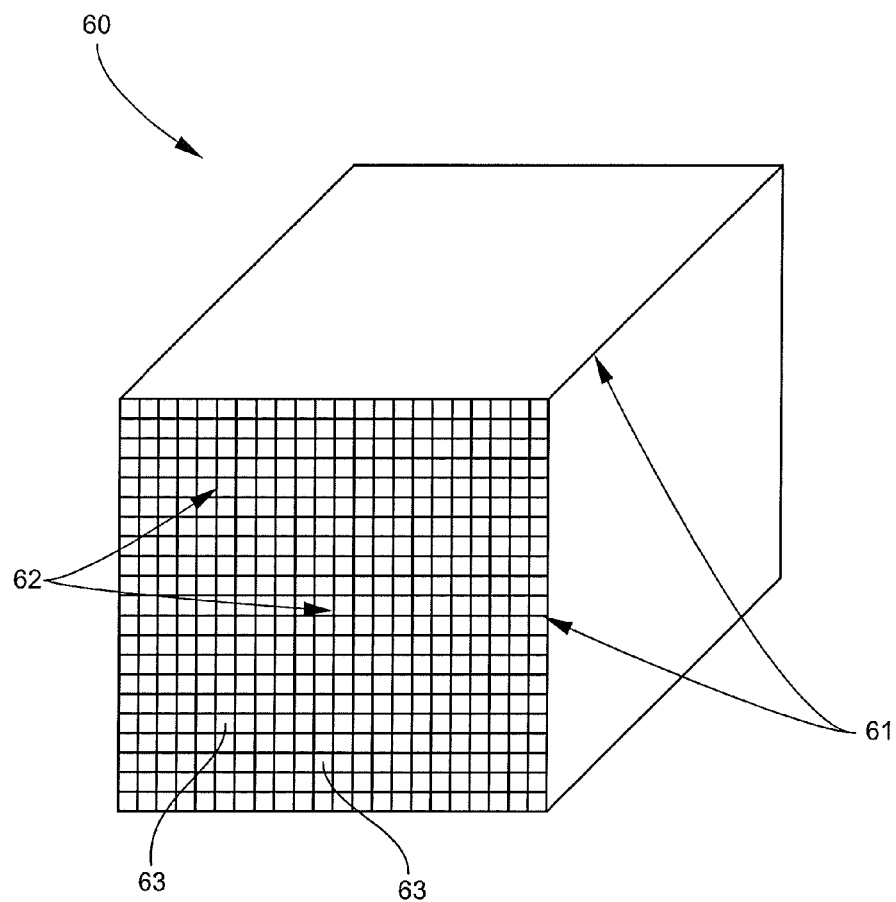
FIG. 6 illustrates a monolithic structural catalyst body for use in a catalyst module according to one embodiment described herein.

FIG. 6 illustrates a honeycomb-like monolithic structural catalyst body for use in one embodiment of a catalyst module described herein. The honeycomb-like monolithic structural catalyst body (60) of FIG. 6 displays an outer peripheral wall (61) and a plurality of inner partition walls (62). The inner partition walls (62) define a plurality of flow channels or cells (63) which extend longitudinally through the honeycomb-like monolithic structural catalyst body. In some embodiments, the outer peripheral wall (61) and/or inner partition walls (62) comprise an inert support material on which catalytic material is deposited. In some embodiments, the outer peripheral wall (61) and/or inner partition walls (62) are formed of a catalytically active material.

In some embodiments, a monolithic structural catalyst body can comprise a uniform chemical composition comprising 50-99.9% by weight an inorganic oxide composition and at least 0.1% by weight a catalytically active metal functional group. The inorganic oxide composition includes, but is not limited to, titania ($TiO_2$), alumina ($Al_2O_3$), zirconia ($ZrO_2$), and/or mixtures thereof. Moreover, in some embodiments, the catalytically active metal functional group includes, but is not limited to, gold, platinum, iridium, palladium osmium, rhodium, rhenium, ruthenium, vanadium pentoxide ($V_2O_5$), tungsten oxide ($WO_3$), molybdenum oxide ($MoO_3$) or other noble metals or mixtures thereof. In further embodiments, the uniform chemical composition can comprise up to 30% by weight other oxides such as silicon dioxide ($SiO_2$), reinforcement agents such as glass fibers and/or extrusion aids.

In some embodiments, catalyst bodies for use in modules described herein comprise plate catalysts. Plate catalysts, in some embodiments, comprise plate-like supports on which catalytic material is deposited. In some embodiments, for example, a plate catalyst body comprises a metal plate or wire mesh support onto which catalytic material is deposited. Catalytic material deposited on a support of a plate catalyst, in some embodiments, comprises gold, platinum, iridium, palladium osmium, rhodium, rhenium, ruthenium, vanadium pentoxide ($V_2O_5$), tungsten oxide ($WO_3$), molybdenum oxide ($MoO_3$) or other noble metals or mixtures thereof.

In some embodiments, catalyst bodies comprise packed bed catalyst. Packed bed catalyst bodies, in some embodiments, comprise particulate catalyst or granular catalyst disposed in a vessel. In some embodiments, particulate or granular catalyst comprises catalytic material disposed on inorganic support particles or granules. In other embodiments, particles or granules are formed of catalytic material such that the catalytic material resides throughout the body of the particles.

Moreover, the vessel in which particulate or granular catalyst is disposed can have any desired shape. In some embodiments, the vessel has a rectangular shape, square shape or other polygonal shape. In some embodiments, the vessel has a cylindrical shape or an elliptical shape.

In some embodiments, catalyst bodies comprise corrugated catalyst. A corrugated catalyst, in some embodiments, comprises a series of corrugated surfaces. In some embodiments, corrugated surfaces alternate with non-corrugated surfaces. Channels for flow conveyance are formed by alternating ridges and/or grooves of the corrugated surfaces. Channels for flow conveyance may also be formed by non-corrugated surfaces if present. Some or all of the surfaces of the corrugated catalyst comprise a substrate material or support onto and/or in which catalytic material is deposited or impregnated. The support material, in some embodiments, comprises ceramic fibers or ceramic paper. Catalytic material deposited onto surfaces of a corrugated catalyst support, in some embodiments, comprises gold, platinum, iridium, palladium osmium, rhodium, rhenium, ruthenium, titanium oxide, vanadium pentoxide ($V_2O_5$), tungsten oxide ($WO_3$), molybdenum oxide ($MoO_3$) or other noble metals or mixtures thereof.

In some embodiments, catalyst bodies for use in modules described herein can comprise any of the foregoing catalyst types in used form including, but not limited to refurbished form, cleaned formed and/or regenerated form. In some embodiments, for example, the increase in cross-sectional catalyst area provided by modules described herein can extend the lifetime of used catalyst bodies, thereby delaying replacement of the used catalyst bodies or delaying the regeneration of the used catalyst bodies. Moreover, in some embodiments, catalyst bodies for use in a module described herein can comprise a mixture of new catalyst bodies and used catalyst bodies.

Catalyst modules described herein additionally comprise a framework in which the catalyst bodies are disposed. The framework can have any design and/or dimension not inconsistent with the objectives of the present invention. In some embodiments, the framework of a catalyst module comprises design and dimensions suitable for use in the industrial selective catalytic reduction (SCR) of nitrogen oxides in an exhaust or flue gas stream including, but not limited to, a flue gas stream produced by a combustion component of a heat recovery steam generator or gas turbine. In some embodiments, the framework of a catalyst module comprises design and dimensions suitable for use in the removal of carbon monoxide or dioxin from an exhaust gas or flue gas stream.

In some embodiments, parameters and dimensions of catalyst modules and/or reactors described herein can vary according to specific application and/or environment in which the module or reactor is placed. In some embodiments parameters and dimensions of catalyst modules are selected according to various factors including maximum pressure drop, maximum module and/or reactor dimensions and weight suitable for a particular application and/or desired catalytic performance of the module and/or reactor.

In some embodiments, the plurality of first ducts, second ducts and any additional ducts of a catalyst module and/or reactor can comprise any design and/or dimension not inconsistent with the objectives of the present invention. As illustrated in FIG. 2 herein, ducts of a catalyst module, in some embodiments, can comprise a tapered design. In some embodiments, the distance between the first catalyst bodies (24) and second catalyst bodies (26) of FIG. 2 can be increased, thereby increasing the lengths of the first ducts (25) and the second ducts (27). Increasing the length of a first duct (25) and/or second duct (27) can permit a more gradual tapering, wherein the transition angle at which the tapering begins is decreased. In some embodiments, the distance between the first catalyst bodies (24) and the second catalyst bodies (26) can be decreased, thereby decreasing the lengths of the first ducts (25) and the second ducts (27). Decreasing the length of a first duct (25) and/or second duct (27) can permit a steeper tapering, wherein the transition angle at which the tapering begins is increased. Moreover, the first catalyst bodies (24), in some embodiments, can be offset from the tapering point of the second ducts (27) by any desired distance. In some embodiments, the second catalyst bodies (26) can be offset from the tapering point of the first ducts (25) by any desired distance.

Additionally, in some embodiments, the inlet facial catalyst area and inlet facial duct area of any module described herein satisfies Equation (I):

$$x < \frac{[\text{total inlet facial catalyst area}]}{[(\text{total inlet facial area of first catalyst}) + (\text{total inlet facial duct area})]}$$

wherein x is 1. In some embodiments, the inlet facial catalyst area and inlet facial duct area of any module described herein satisfies Equation (I) wherein x is 1.1 or 1.4. In some embodiments, the inlet facial catalyst area and inlet facial duct area of any module described herein satisfies Equation (I) wherein x is 2 or 3.

In the catalyst module illustrated in FIG. 2, for example, the total inlet facial catalyst area is the summation of the inlet facial area of the first catalyst bodies (24) and the inlet facial area of the second catalyst bodies (26). The total inlet facial duct area is the total facial area occupied by first ducts (25) measured at the fluid stream inlet side (22) of the module. In embodiments wherein additional catalyst is positioned between the inlet side and the outlet side of the module, inlet facial area of the additional catalyst is used in the determination of total inlet facial catalyst area. Moreover, additional inlet duct(s) associated with additional catalyst is used in the determination of total inlet facial duct area.

In some embodiments, ducts of a catalyst module described herein have design and dimensions suitable for use with catalyst bodies in the industrial fluid treatment applications, including the selective catalytic reduction (SCR) of nitrogen oxides. In some embodiments, for example, catalyst modules and/or reactors described herein find application in HRSG or gas turbine exhaust gas treatment systems.

Additionally, ducts of catalyst modules described herein can be constructed of any material not inconsistent with the objectives of the present invention. In some embodiments, the plurality of first ducts, second ducts and any additional ducts are constructed of metal or other heat tolerant material.

II. Catalytic Reactors

In another aspect, catalytic reactors comprising one or more catalyst modules described herein are provided. In some embodiments, a catalytic reactor comprises a housing and at least one catalyst module disposed in the housing. The catalyst module disposed in the housing, in some embodiments, comprises a fluid stream inlet side comprising a plurality of first catalyst bodies and a plurality of first ducts and a fluid stream outlet side comprising a plurality of second catalyst bodies and a plurality of second ducts, wherein the first ducts are a fluid stream inlet to the second catalyst bodies, and the second ducts are a fluid stream outlet for the first catalyst bodies.

In some embodiments, a catalytic reactor comprises a fluid stream inlet side comprising at least one first catalyst module and at least one first duct and a fluid stream outlet side comprising at least one second catalyst module and at least one second duct, wherein the at least one first duct is a fluid stream inlet to the at least one second catalyst module and the at least one second duct is a fluid stream outlet of the at least one first catalyst module.

In some embodiments, a catalytic reactor comprises a fluid stream inlet side comprising a plurality of first catalyst modules and a plurality first ducts and a fluid stream outlet side comprising a plurality of second catalyst modules and a plurality of second ducts, wherein the first ducts are a fluid stream inlet to the second catalyst modules, and the second ducts are a fluid stream outlet of the first catalyst modules.

In some embodiments, a catalytic reactor further comprises at least one additional catalyst module positioned between the inlet side and the outlet side of the catalytic reactor and at least one additional fluid stream inlet duct to the at least one additional catalyst module and at least one additional fluid stream outlet duct of the at least one additional catalyst module. In some embodiments, a catalytic reactor further comprises at least one additional catalyst module positioned between the inlet side and the outlet side of the reactor, wherein a first duct serves as a fluid stream inlet to the at least one additional catalyst module and a second duct serves as a fluid stream outlet for the at least one additional catalyst module. In some embodiments wherein a first duct is a fluid stream inlet to one or more additional catalyst modules positioned between the inlet side and outlet side of the reactor, the first duct provides a fluid stream to the additional catalyst modules as well as to the second catalyst modules at the outlet side of the reactor. In some embodiments wherein a second duct is a fluid stream outlet for one or more additional catalyst bodies positioned between the inlet side and the outlet side of the reactor, the second duct provides a fluid stream outlet for the additional catalyst modules and first catalyst module.

Catalyst modules of a catalytic reactor comprise one or more catalyst bodies. In some embodiments, catalyst modules comprise any of the catalyst bodies described herein. In some embodiments, catalyst modules of a catalytic reactor can comprise any of the constructions and/or designs described herein.

Figure 7:
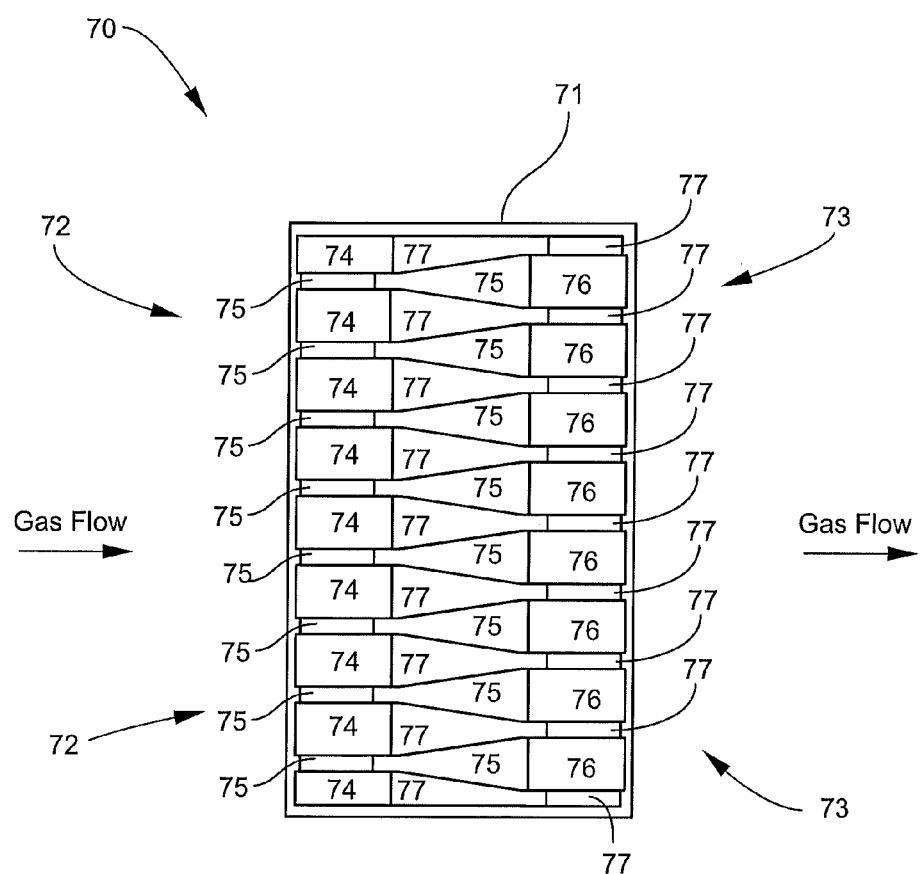
FIG. 7 illustrates a cross-sectional view of a catalytic reactor according to one embodiment described herein.

FIG. 7 illustrates a cross-sectional view of a catalytic reactor according to one embodiment of the present invention. The catalytic reactor (70) illustrated in FIG. 7 comprises a housing (71) having a fluid stream inlet side (72) and a fluid stream outlet side (73). The fluid stream inlet side (72) comprises a plurality of first catalyst modules (74) and a plurality of first ducts (75). The fluid stream outlet side (73) comprises a plurality of second catalyst modules (76) and a plurality of second ducts (77). The first ducts (75) are a fluid stream inlet for the second catalyst modules (76) while the second ducts (77) are a fluid stream outlet for the first catalyst modules (74).

Figure 8:
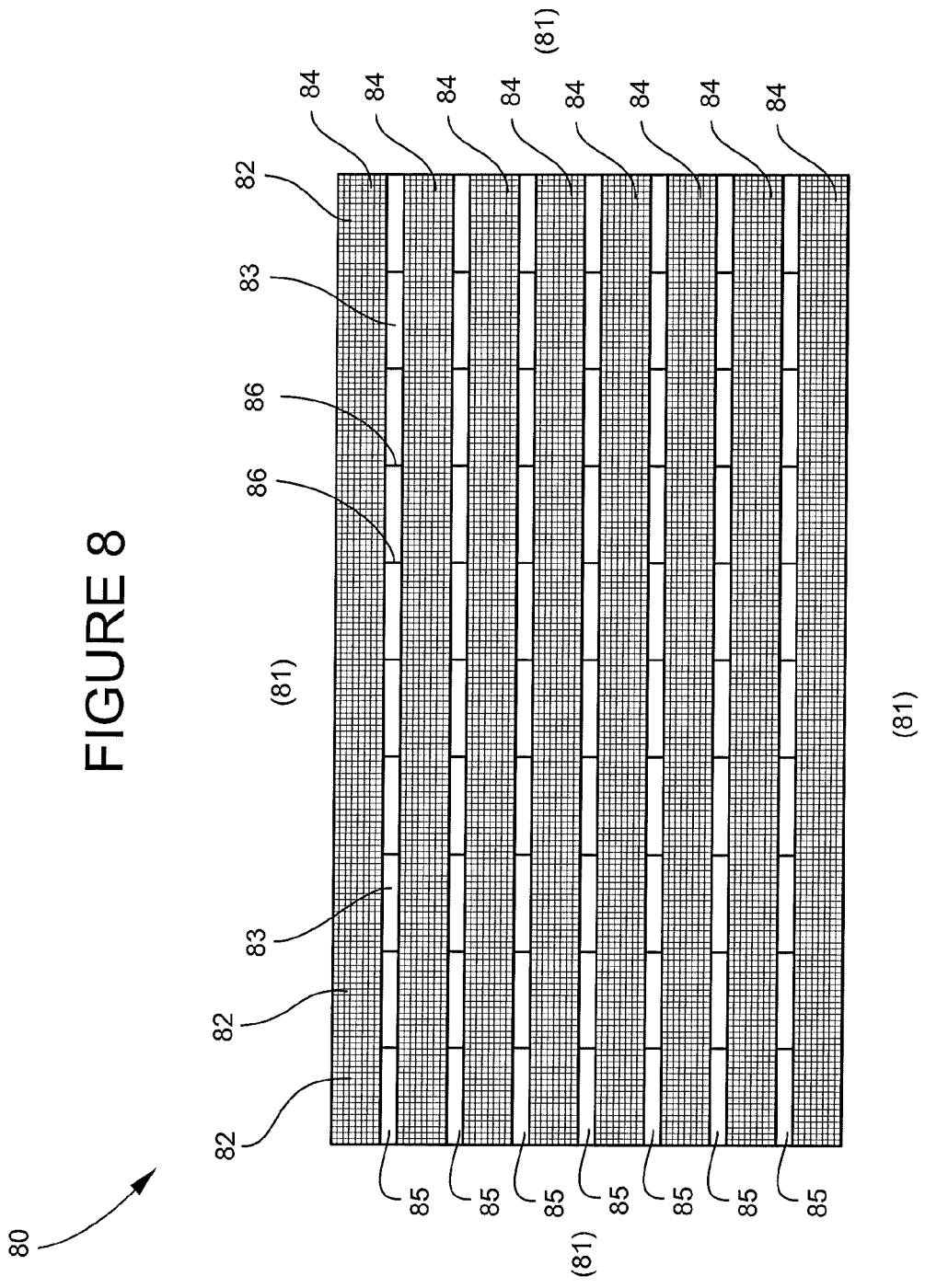
FIG. 8 illustrates a plan view of the inlet side of a catalytic reactor according to one embodiment described herein.

FIG. 8 illustrates a plan view of the inlet side of a catalytic reactor according to one embodiment of the present invention. As illustrated in FIG. 8, the inlet side (81) of the catalytic reactor (80) comprises a plurality of first catalyst modules (82) and a plurality of first ducts (83). The first catalyst modules (82) are arranged into rows (84) which alternate with rows (85) of the first ducts (83). In the embodiment illustrated in FIG. 8, posts (86) are used to delineate entrances of the first ducts (83).

In an alternative embodiment, the first catalyst modules are arranged into columns which alternate with columns of the first ducts.

Figure 9:
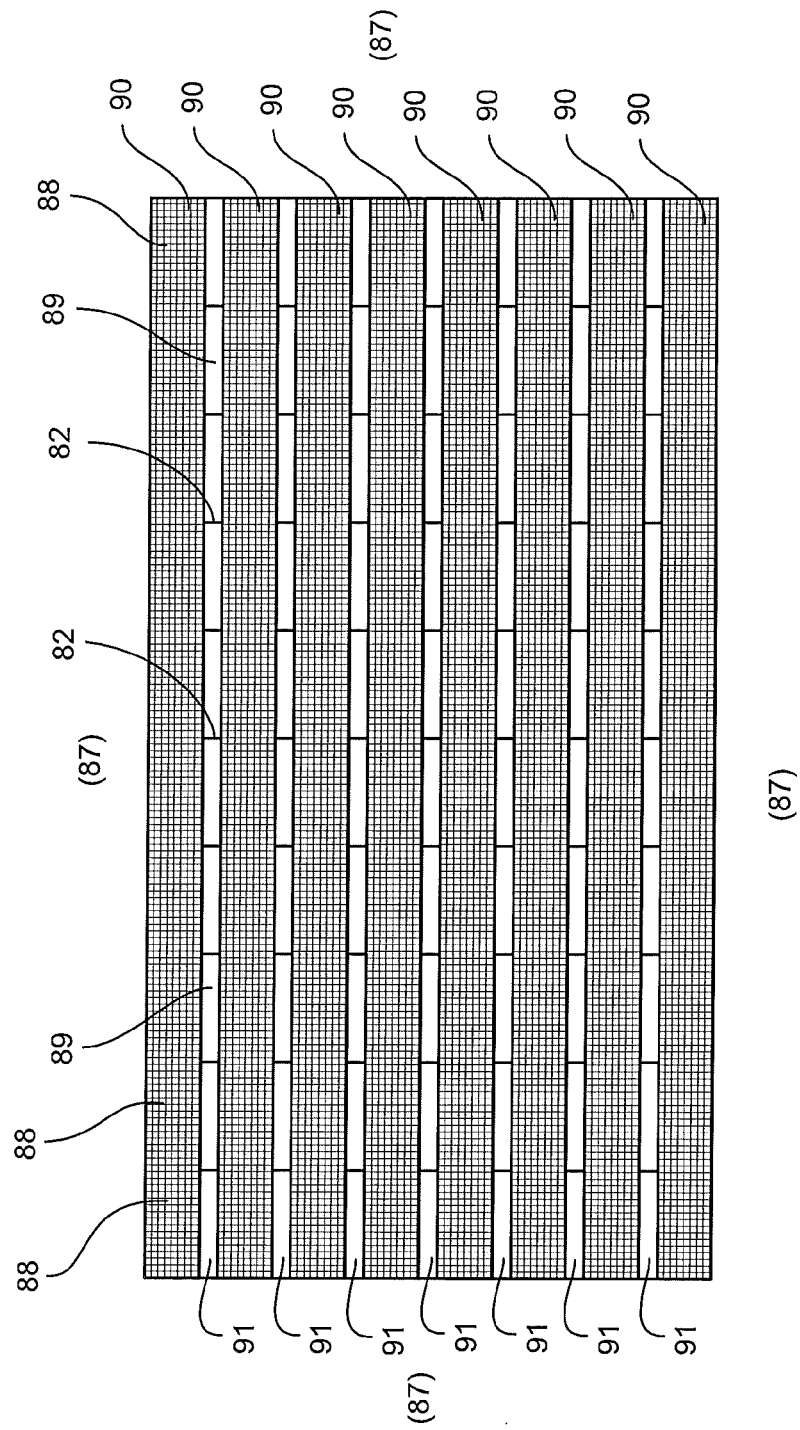
FIG. 9 illustrates a plan view of the outlet side of a catalytic reactor according to one embodiment described herein.

FIG. 9 illustrates a plan view of the outlet side of the catalytic reactor (80) illustrated in FIG. 8. The outlet side (87) of the catalytic reactor (80) comprises a plurality of second catalyst modules (88) and a plurality of second ducts (89). The second catalyst modules (88) are arranged into rows (90) which alternate with rows (91) of the second ducts (89). In the embodiment illustrated in FIG. 9, posts (92) are used to delineate the second ducts (89).

In an alternative embodiment, the second catalyst modules are arranged into columns which alternate with columns of the second ducts.

The first ducts (83) of the inlet side (81) of the catalytic reactor (80) illustrated in FIG. 8 are fluid stream inlets for the second catalyst modules (88) on the outlet side (87) of the catalytic reactor illustrated in FIG. 9. Moreover, the second ducts (89) of the outlet side (87) of the catalytic reactor (80) are fluid stream outlets for the first catalyst modules (82).

Catalytic reactors described herein can be used in a variety of fluid stream treatment applications. In some embodiments, catalytic reactors described herein find application in the selective catalytic reduction (SCR) of nitrogen oxides in an exhaust or flue gas stream. In some embodiments, catalytic reactors find application in SCR of exhaust or flue gas streams resulting from industrial applications such as electrical power generation and/or the combustion of hydrocarbon sources for manufacturing processes. Moreover, in some embodiments, catalytic reactors described herein are operable for the removal of carbon monoxide or dioxin from an exhaust gas or flue gas stream.

III. Chemical Species Capture Apparatus

In another aspect, chemical species capture apparatus are described herein. In some embodiments, a chemical species capture apparatus comprises a fluid stream inlet side comprising at least one first capture body and at least one first duct and a fluid stream outlet side comprising at least one second capture body and at least one second duct, wherein the at least one first duct is a fluid stream inlet to the at least one second capture body and the at least one second duct is a fluid stream outlet for the at least one first capture body.

In some embodiments, a chemical species capture apparatus comprises a fluid stream inlet side comprising a plurality of first capture bodies and a plurality of first ducts and a fluid stream outlet side comprising a plurality of second capture bodies and a plurality of second ducts, wherein the first ducts are a fluid stream inlet to the second capture bodies and the second ducts are a fluid stream outlet for the first capture bodies.

A chemical species capture apparatus, in some embodiments, further comprises at least one additional capture body positioned between the inlet side and the outlet side of the module and a least one additional fluid stream duct to the at least one additional capture body and at least one additional fluid stream outlet duct of the at least one additional capture body. In some embodiments, a chemical species capture apparatus comprises at least one additional capture body positioned between the inlet side and the outlet side of the apparatus, wherein a first duct serves as a fluid stream inlet to the at least one additional capture body and a second duct serves as a fluid stream outlet of the at least one additional capture body. In some embodiments wherein a first duct is a fluid stream inlet to one or more additional capture bodies positioned between the inlet side and outlet side of the apparatus, the first duct provides a fluid stream to the additional capture bodies as well as to a second capture body at the outlet side of the apparatus. In some embodiments wherein a second duct is a fluid stream outlet for one or more additional capture bodies positioned between the inlet side and the outlet side of the apparatus, the second duct provides a fluid stream outlet for the additional capture bodies and first capture body.

Capture bodies, in some embodiments, are operable to remove one or more chemical species from a fluid stream. In some embodiments, capture bodies reversibly remove at least one chemical species from a fluid stream. In some embodiments, capture bodies irreversibly remove at least one chemical species from a fluid stream, including liquid and/or gaseous fluid stream. In some embodiments, capture bodies for use in chemical species capture apparatus described herein are operable for applications including, but not limited to, volatile organic compound (VOC) abatement, mercury capture and flue gas desulfurization. Additionally, in some embodiments, capture bodies are operable for use as air separation absorbers or dehumidification absorbers. In some embodiments, capture bodies are operable to remove one or more chemical species from an aqueous fluid stream or an organic fluid stream.

In another aspect, chemical species capture reactors comprising one or more chemical species capture apparatus are described herein. In some embodiments, a chemical species capture reactor comprises a housing and at least one capture apparatus disposed in the housing. The capture apparatus disposed in the housing, in some embodiments, comprises a fluid stream inlet side comprising at least one first capture body and at least one first duct and a fluid stream outlet side comprising at least one second capture body and at least one second duct, wherein the at least one first duct is a fluid stream inlet to the at least one second capture body and the at least one second duct is a fluid stream outlet for the at least one first capture body.

The capture apparatus disposed in the housing, in some embodiments, comprises a fluid stream inlet side comprising a plurality of first capture bodies and a plurality of first ducts and a fluid stream outlet side comprising a plurality of second capture bodies and a plurality of second ducts, wherein the first ducts are a fluid stream inlet to the second capture bodies and the second ducts are a fluid stream outlet for the first capture bodies.

In some embodiments, a chemical species capture reactor further comprises at least one additional capture apparatus positioned between the inlet side and the outlet side of the reactor and at least one additional fluid stream inlet duct to the at least one additional capture apparatus and at least one additional fluid stream outlet duct of the at least one additional capture apparatus. In some embodiments, a chemical species capture reactor further comprises at least one additional capture apparatus positioned between the inlet side and the outlet side of the reactor, wherein a first duct serves as a fluid stream inlet to the at least one additional capture apparatus and a second duct serves as a fluid stream outlet for the at least one additional capture apparatus. In some embodiments wherein a first duct is a fluid stream inlet to one or more additional capture apparatus positioned between the inlet side and outlet side of the reactor, the first duct provides a fluid stream to the additional capture apparatus as well as to the second capture apparatus at the outlet side of the reactor. In some embodiments wherein a second duct is a fluid stream outlet for one or more additional capture apparatus positioned between the inlet side and the outlet side of the reactor, the second duct provides a fluid stream outlet for the additional capture apparatus and first capture apparatus.

IV. Methods of Treating a Fluid Stream

In another aspect, methods of treating a fluid stream are described herein. In one embodiment, a method of treating a fluid stream comprises providing at least one catalyst module comprising a fluid stream inlet side comprising at least one first catalyst body and at least one first duct and a fluid stream outlet side comprising at least one second catalyst body and at least one second duct, wherein the at least one first duct is a fluid stream inlet to the at least one second catalyst body and the at least one second duct is a fluid stream outlet for the at least one first catalyst body. A first portion of the fluid stream, in some embodiments, is passed through the at least one first catalyst body and out of the module through the at least one second duct. A second portion of the fluid stream, in some embodiments, is passed through the at least one second catalyst body via the at least one first duct.

In some embodiments, a method of treating a fluid stream comprises providing at least one catalyst module comprising a fluid stream inlet side comprising a plurality of first catalyst bodies and a plurality of first ducts and a fluid stream outlet side comprising a plurality of second catalyst bodies and a plurality of second ducts, wherein the first ducts are a fluid stream inlet to the second catalyst bodies and the second ducts are a fluid stream outlet for the first catalyst bodies. A first portion of the fluid stream, in some embodiments, is passed through the first catalyst bodies and out of the module through the second ducts. A second portion of the fluid stream, in some embodiments, is passed through the second catalyst bodies via the first ducts.

In some embodiments, a catalyst module further comprises at least one additional catalyst body positioned between the inlet side and the outlet side of the module and at least one additional fluid stream inlet duct to the at least one additional catalyst body and at least one additional fluid stream outlet duct of the at least one additional catalyst body. In some embodiments, a portion of the fluid stream is passed into the at least one additional catalyst body through the additional inlet duct and out of the module through the additional outlet duct. In some embodiments, the module does not comprise at least one additional fluid stream inlet duct for the at least one additional catalyst body and at least one additional fluid stream outlet duct of the at least one additional catalyst body. In such embodiments, one or more first ducts at the inlet side of the module provide a portion of a fluid stream to the at least one additional catalyst body and one or more second ducts provide a fluid stream outlet for the at least one catalyst body.

In some embodiments, a method of treating a fluid stream comprises providing at least one catalyst reactor comprising a fluid stream inlet side comprising at least one first catalyst module and at least one first duct and a fluid stream outlet side comprising at least one second catalyst module and at least one second duct, wherein the at least one first duct is a fluid stream inlet to the at least one second catalyst module and the at least one second duct is a fluid stream outlet for the at least one first catalyst module. A first portion of the fluid stream, in some embodiments, is passed through the at least one first catalyst module and out of the reactor through the at least one second duct. A second portion of the fluid stream, in some embodiments, is passed through the at least one second catalyst module via the at least one first duct.

A method of treating a fluid stream, in some embodiments, comprises providing a catalytic reactor comprising a fluid stream inlet side comprising a plurality of first catalyst modules and a plurality first ducts and a fluid stream outlet side comprising a plurality of second catalyst modules and a plurality of second ducts, wherein the first ducts are a fluid stream inlet to the second catalyst modules, and the second ducts are a fluid stream outlet of the first catalyst modules. A first portion of the fluid stream, in some embodiments, is at least partially passed through the first catalyst modules and out of the catalytic reactor through the second ducts. In some embodiments, a second portion of the fluid stream is at least partially passed through the second catalyst modules via the first ducts.

In some embodiments, a catalytic reactor further comprises at least one additional catalyst module positioned between the inlet side and the outlet side of the catalytic reactor and at least one additional fluid stream inlet duct to the at least one additional catalyst module and at least one additional fluid stream outlet duct of the at least one additional catalyst module. In some embodiments, a portion of the fluid stream is passed into the at least one additional catalyst module through the additional inlet duct and out of the reactor through the additional outlet duct. In some embodiments, the reactor does not comprise at least one additional fluid stream inlet duct for the at least one additional catalyst module and at least one additional fluid stream outlet duct of the at least one additional catalyst module. In such embodiments, one or more first ducts at the inlet side of the reactor provide a portion of a fluid stream to the at least one additional catalyst module and one or more second ducts provide a fluid stream outlet for the at least one catalyst module.

In some embodiments, a method of treating a fluid stream comprises providing at least one chemical species capture apparatus comprising a fluid stream inlet side comprising at least one first capture body and at least one first duct and a fluid stream outlet side comprising at least one second capture body and at least one second duct, wherein the at least one first duct is a fluid stream inlet to the at least one second capture body and the at least one second duct is a fluid stream outlet for the at least one first capture body. A first portion of the fluid stream, in some embodiments, is passed through the at least one first capture body and out of the apparatus through the at least one second duct. A second portion of the fluid stream, in some embodiments, is passed through the at least one second capture body via the at least one first duct.

In some embodiments, a method of treating a fluid stream comprises providing at least one chemical species capture apparatus comprising a fluid stream inlet side comprising a plurality of first capture bodies and a plurality of first ducts and a fluid stream outlet side comprising a plurality of second capture bodies and a plurality of second ducts, wherein the first ducts are a fluid stream inlet to the second capture bodies and the second ducts are a fluid stream outlet for the first capture bodies. A first portion of the fluid stream, in some embodiments, is passed through the first capture bodies and out of the apparatus through the second ducts. A second portion of the fluid stream, in some embodiments, is passed through the second capture bodies via the first ducts.

In some embodiments, a chemical species capture apparatus further comprises at least one additional capture body positioned between the inlet side and the outlet side of the capture apparatus and at least one additional fluid stream inlet duct to the at least one additional capture body and at least one additional fluid stream outlet duct of the at least one additional capture body. In some embodiments, a portion of the fluid stream is passed into the at least one additional capture body through the additional inlet duct and out of the capture apparatus through the additional outlet duct. In some embodiments, the chemical species capture apparatus does not comprise at least one additional fluid stream inlet duct for the at least one additional capture body and at least one additional fluid stream outlet duct of the at least one additional capture body. In such embodiments, one or more first ducts at the inlet side of the capture apparatus provide a portion of a fluid stream to the at least one additional capture body and one or more second ducts provide a fluid stream outlet for the at least one capture body.

In some embodiments, a fluid stream passed through catalyst modules, catalytic reactors and/or capture apparatus described herein comprises an exhaust gas or flue gas stream. In some embodiments, an exhaust gas or flue gas stream is generated by the combustion of one or more hydrocarbon sources including, but not limited to, coal, natural gas and/or petroleum products.

In some embodiments, an exhaust gas or flue gas stream passed through catalyst modules, catalytic reactors, capture apparatus and/or capture reactors described herein is generated by a gas turbine, gas boiler or a coal-fired boiler. In some embodiments, an exhaust gas or flue gas stream passed through catalyst modules, catalytic reactors, capture apparatus and/or capture reactors described herein is generated by a combustion component upstream of a HRSG. In some embodiments, a combustion component upstream of a HRSG comprises gas turbine.

In some embodiments, an exhaust gas or flue gas stream is provided to catalyst modules, catalytic reactors, capture apparatus and/or capture reactors described herein at a flow rate of at least 9,000 lb/hr. In some embodiments, an exhaust gas or flue gas stream is provided to catalyst modules, catalytic reactors, capture apparatus and/or capture reactors described herein at a flow rate of at least 50,000 lb/hr or 500,000 lb/hr. In some embodiments, an exhaust gas or flue gas stream is provided to catalyst modules, catalytic reactors, capture apparatus and/or capture reactors described herein at a flow rate of at least 900,000 lb/hr.

An exhaust gas stream or flue gas stream, in some embodiments, comprises on or more species of nitrogen oxide ($NO_x$). In some embodiments of methods of treating an exhaust or flue gas described herein, one or more species of nitrogen oxide is selectively catalytically decomposed. In some embodiments of treating an exhaust or flue as described herein, carbon monoxide and/or dioxin is removed from the exhaust or flue gas stream. Additionally, in some embodiments, one or more VOCs, mercury or sulfur species are captured or otherwise removed from an exhaust gas or flue gas stream.

In some embodiments, a fluid stream passed through catalyst modules, catalytic reactors and/or capture apparatus described herein comprises a liquid stream. In some embodiments, a liquid stream comprises one or more contaminants or species to be removed from the stream. In some embodiments, a liquid stream can comprise an aqueous liquid stream. In some embodiments, a liquid stream can comprise a non-aqueous or organic liquid stream.

Various embodiments of the invention have been described in fulfillment of the various objectives of the invention. It should be recognized that these embodiments are merely illustrative of the principles of the present invention. Numerous modifications and adaptations thereof will be readily apparent to those of skill in the art without departing from the spirit and scope of the invention.

That which is claimed is:

1. A catalyst module comprising:
   a fluid stream inlet side comprising at least one first catalyst body and at least one first duct; and
   a fluid stream outlet side comprising at least one second catalyst body and at least one second duct, wherein the at least one first duct is a fluid stream inlet to the at least one second catalyst body and the at least one second duct is a fluid stream outlet of the at least one first catalyst body.

2. The catalyst module of claim 1, wherein the fluid stream inlet side further comprises a plurality of first catalyst bodies and a plurality of first ducts and the fluid stream outlet side further comprises a plurality of second catalyst bodies and a plurality of second ducts wherein the first ducts are a fluid stream inlet to the second catalyst bodies and the second ducts are a fluid stream outlet of the first catalyst bodies.

3. The catalyst module of claim 2 comprising at least one row of the first catalyst bodies.

4. The catalyst module of claim 3 comprising a plurality of rows of the first catalyst bodies.

5. The catalyst module of claim 4 comprising a plurality of rows of the second ducts.

6. The catalyst module of claim 2 comprising at least one row of the second catalyst bodies.

7. The catalyst module of claim 6 comprising a plurality of rows of the second catalyst bodies.

8. The catalyst module of claim 7 comprising a plurality of rows of the first ducts.

9. The catalyst module of claim 2, wherein at least one of the first ducts and second ducts is tapered.

10. The catalyst module of claim 2 further comprising posts at least partially defining openings of the first ducts.

11. The catalyst module of claim 1, wherein the module satisfies the equation:

$$x < \frac{[\text{total inlet facial catalyst area}]}{[(\text{total inlet facial area of first catalyst}) + (\text{total inlet facial duct area})]}$$

wherein x is 1.

12. The catalyst module of claim 1, wherein the module satisfies the equation:

$$x < \frac{[\text{total inlet facial catalyst area}]}{[(\text{total inlet facial area of first catalyst}) + (\text{total inlet facial duct area})]}$$

wherein x is 1.1.

13. The catalyst module of claim 1, wherein the module satisfies the equation:

$$x < \frac{[\text{total inlet facial catalyst area}]}{[(\text{total inlet facial area of first catalyst}) + (\text{total inlet facial duct area})]}$$

wherein x is 1.4.

14. The catalyst module of claim 1, wherein the first catalyst body and the second catalyst body comprise monolithic structural catalyst bodies.

15. The catalyst module of claim 1, wherein at least one of the first catalyst body and the second catalyst body comprises a plate catalyst body, packed bed catalyst body or corrugated catalyst body.

16. The catalyst module of claim 1, wherein at least one of the first catalyst body and the second catalyst body is a used catalyst body.

17. The catalyst module of claim 1 further comprising at least one additional catalyst body positioned between the inlet side and the outlet side of the module.

18. The catalyst module of claim 2 further comprising a plurality of additional catalyst bodies positioned between the inlet side and the outlet side of the module.

19. The catalyst module of claim 17 further comprising at least one additional fluid stream inlet duct to the at least one additional catalyst body and at least one additional fluid stream outlet duct of the at least one additional catalyst body.

20. The catalyst module of claim 18 further comprising a plurality of additional fluid stream inlet ducts to the additional catalyst bodies and a plurality of additional fluid stream outlets of the additional catalyst bodies.

21. A catalyst module comprising:
   a fluid stream inlet side comprising a plurality of rows of first structural catalyst bodies and a plurality of rows of first ducts; and
   a fluid stream outlet side comprising a plurality of rows of second structural catalyst bodies and a plurality of rows of second ducts, wherein the first ducts are a fluid stream inlet to the second catalyst bodies and the second ducts are a fluid stream outlet of the first catalyst bodies and wherein the module satisfies the following equation:

$$x < \frac{[\text{total inlet facial catalyst area}]}{[(\text{total inlet facial area of first catalyst}) + (\text{total inlet facial duct area})]}$$

wherein x is 1 or 1.1.

22. The catalyst module of claim 21, wherein at least one of the first structural catalyst bodies and the second structural catalyst bodies comprises used structural catalyst bodies.

23. A catalytic reactor comprising:
   at least one catalyst module, the at least one catalyst module comprising:
   a fluid stream inlet side comprising a plurality of first catalyst bodies and a plurality of first ducts; and a fluid stream outlet side comprising a plurality of second catalyst bodies and a plurality of second ducts, wherein the first ducts are a fluid stream inlet to the second catalyst bodies and the second ducts are a fluid stream outlet of the first catalyst bodies.

24. The catalytic reactor of claim 23, wherein at least one of the first catalyst bodies and the second catalyst bodies comprises monolithic structural catalyst bodies.

25. The catalytic reactor of claim 23, wherein at least one of the first catalyst bodies and the second catalyst bodies comprises plate catalyst bodies, packed bed catalyst bodies or corrugated catalyst bodies.

26. The catalytic reactor of claim 23 further comprising at least one additional catalyst body positioned between the inlet side and the outlet side of the module and at least one additional fluid stream inlet duct to the at least one additional catalyst body and at least one additional fluid stream outlet duct of the at least one additional catalyst body.

27. The catalytic reactor of claim 23 further comprising a plurality of additional catalyst bodies positioned between the inlet side and the outlet side of the module and a plurality of additional fluid stream inlets ducts to the additional catalyst bodies and a plurality of additional fluid stream outlet ducts of the additional catalyst bodies.

28. A catalytic reactor comprising:
at least one catalyst module having dimensions suitable for treating a flue gas stream from a gas turbine, a gas boiler or a coal-fired boiler, the at least one catalyst module comprising:
a flue gas stream inlet side comprising a plurality of rows of first structural catalyst bodies and a plurality of rows of first ducts; and
a flue gas stream outlet side comprising a plurality of rows of second structural catalyst bodies and a plurality of rows of second ducts, wherein the first ducts are a flue gas stream inlet to the second catalyst bodies and the second ducts are a flue gas stream outlet of the first catalyst bodies and wherein the module satisfies the following equation:

$$x < \frac{[\text{total inlet facial catalyst area}]}{\begin{bmatrix}(\text{total inlet facial area of first catalyst}) + \\ (\text{total inlet facial duct area})\end{bmatrix}}$$

wherein x is 1 or 1.1.

29. The catalytic reactor of claim 28, wherein at least one of the first structural catalyst bodies and the second structural catalyst bodies comprises used structural catalyst bodies.

30. The catalytic reactor of claim 28, wherein the gas turbine is upstream of a heat recovery steam generator.

31. A catalytic reactor comprising:
a fluid stream inlet side comprising a plurality of first catalyst modules and a plurality of first ducts; and
a fluid stream outlet side comprising a plurality of second catalyst modules and a plurality of second ducts, wherein the first ducts are a fluid stream inlet to the second catalyst modules and the second ducts are a fluid stream outlet of the first catalyst modules.

32. The catalytic reactor of claim 31, wherein at least one of the first catalyst modules and the second catalyst modules comprises a plurality of catalyst bodies.

33. The catalytic reactor of claim 31 further comprising at least one additional catalyst module positioned between the inlet side and the outlet side of the catalytic reactor and at least one additional fluid stream inlet duct to the at least one additional catalyst module and at least one additional fluid stream outlet duct of the at least one additional catalyst module.

34. A method of treating a fluid stream comprising:
providing at least one catalyst module comprising a fluid stream inlet side comprising a plurality of first catalyst bodies and a plurality of first ducts and a fluid stream outlet side comprising a plurality of second catalyst bodies and a plurality of second ducts, wherein the first ducts are a fluid stream inlet to the second catalyst bodies and the second ducts are a fluid stream outlet of the first catalyst bodies; and
passing a first portion of the fluid stream through the first catalyst bodies and out of the module through the second ducts.

35. The method of claim 34 further comprising passing a second portion of the fluid stream through the second catalyst bodies via the first ducts.

36. The method of claim 34, wherein the at least one catalyst module further comprises at least one additional catalyst body positioned between the fluid stream inlet side and fluid stream outlet side wherein a portion of the fluid stream is passed through the at least one additional catalyst body.

37. The method of claim 34, wherein the fluid stream is a flue gas stream generated by a gas turbine, a gas boiler or a coal-fired boiler.

38. The method of claim 37, wherein the gas turbine is upstream of a heat recovery steam generator.

39. A chemical species capture apparatus comprising:
a fluid stream inlet side comprising a first capture body and a first duct; and
a fluid stream outlet side comprising a second capture body and a second duct, wherein the first duct is a fluid stream inlet to the second capture body and the second duct is a fluid stream outlet of the first capture body.

40. The catalyst module of claim 39, wherein the fluid stream inlet side further comprises a plurality of first capture bodies and a plurality of first ducts and the fluid stream outlet side further comprises a plurality of second capture bodies and a plurality of second ducts wherein the first ducts are a fluid stream inlet to the second capture bodies and the second ducts are a fluid stream outlet of the first capture bodies.

41. The chemical species capture apparatus of claim 39 further comprising at least one additional capture body positioned between the inlet side and the outlet side of the apparatus.

42. The chemical capture apparatus of claim 40 further comprising a plurality of additional catalyst bodies positioned between the inlet side and the outlet side of the apparatus.

* * * * *